US006918383B2

(12) United States Patent
Hunt et al.

(10) Patent No.: US 6,918,383 B2
(45) Date of Patent: Jul. 19, 2005

(54) FUEL CONTROL SYSTEM

(75) Inventors: Frank Warren Hunt, West Bloomfield, MI (US); Ayumu Miyajima, Farmington Hills, MI (US); George Saikalis, West Bloomfield, MI (US); Jonathan Borg, Livonia, MI (US); Shigeru Oho, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 58 days.

(21) Appl. No.: 10/614,881

(22) Filed: Jul. 8, 2003

(65) Prior Publication Data

US 2004/0003790 A1 Jan. 8, 2004

Related U.S. Application Data

(63) Continuation-in-part of application No. 10/094,188, filed on Mar. 8, 2002, now Pat. No. 6,843,238.

(51) Int. Cl.[7] .............................................. F02M 23/00
(52) U.S. Cl. ................................. 123/531; 123/179.17
(58) Field of Search ................................ 123/585, 586, 123/587, 588, 531, 533, 179.17

(56) References Cited

U.S. PATENT DOCUMENTS

| 3,882,831 | A | * | 5/1975 | Date et al. ................... 123/274 |
|---|---|---|---|---|
| 3,967,595 | A | * | 7/1976 | Yagi et al. .................... 123/260 |
| 3,994,129 | A | * | 11/1976 | Sakurai et al. ................ 60/298 |
| 4,108,124 | A | * | 8/1978 | Nakagawa et al. .......... 123/286 |
| 4,125,102 | A | | 11/1978 | Tanaka et al. ............... 123/139 |
| 4,195,602 | A | * | 4/1980 | Yamashita et al. .......... 123/327 |
| 4,568,265 | A | * | 2/1986 | Firey ............................... 431/1 |
| 5,119,794 | A | | 6/1992 | Kushida et al. ............. 123/549 |
| 5,284,117 | A | | 2/1994 | Akase ......................... 123/445 |
| 5,465,701 | A | | 11/1995 | Hunt ........................... 125/531 |
| 5,482,023 | A | | 1/1996 | Hunt et al. ................... 125/491 |
| 5,529,035 | A | | 6/1996 | Hunt et al. ............ 123/179.15 |
| 5,586,539 | A | | 12/1996 | Yonekawa et al. ........... 123/458 |
| 5,598,826 | A | | 2/1997 | Hunt et al. .................. 123/491 |
| 5,601,059 | A | | 2/1997 | White et al. ............ 123/184.21 |
| 5,694,906 | A | | 12/1997 | Lange et al. ................. 123/549 |
| 5,850,822 | A | | 12/1998 | Romann et al. ............. 123/549 |
| 5,873,354 | A | | 2/1999 | Krohn et al. ................ 123/549 |
| 5,894,832 | A | | 4/1999 | Nogi et al. ................... 123/491 |
| 5,934,260 | A | | 8/1999 | Gadkaree et al. ........... 123/520 |
| 6,058,915 | A | | 5/2000 | Abidin et al. ................ 123/546 |
| 6,109,247 | A | | 8/2000 | Hunt ........................... 123/549 |
| 6,279,549 | B1 | | 8/2001 | Hunt et al. ................... 123/549 |
| 6,334,418 | B1 | | 1/2002 | Hubbard ................ 123/179.21 |
| 6,543,412 | B2 | | 4/2003 | Amou et al. ................. 123/337 |

FOREIGN PATENT DOCUMENTS

| DE | 197 49 471 | 5/1999 |
|---|---|---|
| DE | 101 15 442 | 10/2001 |
| DE | 101 15 282 | 11/2001 |
| GB | 966 012 | 8/1964 |

* cited by examiner

*Primary Examiner*—Carl S. Miller
(74) *Attorney, Agent, or Firm*—Gifford, Krass, Groh, Sprinkle, Anderson & Citkowski, P.C.

(57) ABSTRACT

A cold start fuel control system is disclosed for use with an internal combustion engine having a plurality of combustion chambers, a source of fuel and an intake manifold having an inlet and an outlet port connected to each combustion chamber. The system includes a cold start fuel injector assembly having an inlet and an outlet to provide a vapor fuel charge during a cold start engine condition. The cold start fuel injector assembly inlet is fluidly connected to the source of fuel. An auxiliary intake manifold has an internal chamber and the cold start fuel injector assembly outlet is fluidly connected to the auxiliary intake manifold chamber. The auxiliary intake manifold chamber is then fluidly connected through a control orifice to each of the combustion chambers at a position downstream from the inlet of the primary intake manifold. A control circuit optionally controls the area of the control orifice to minimize noxious emissions from the engine and a shroud is optionally associated with each control orifice to enhance mixing of the vapor fuel with the inducted airflow to also minimize noxious emissions from the engine.

26 Claims, 3 Drawing Sheets

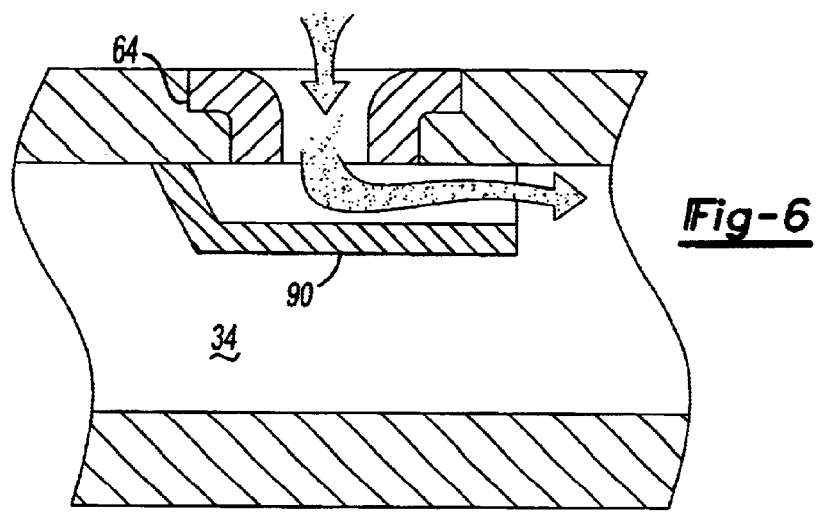
*Fig-6*
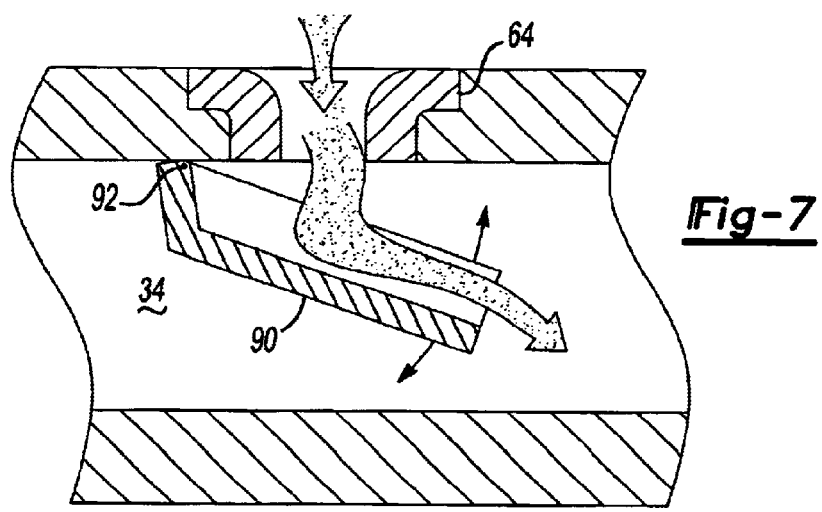
*Fig-7*
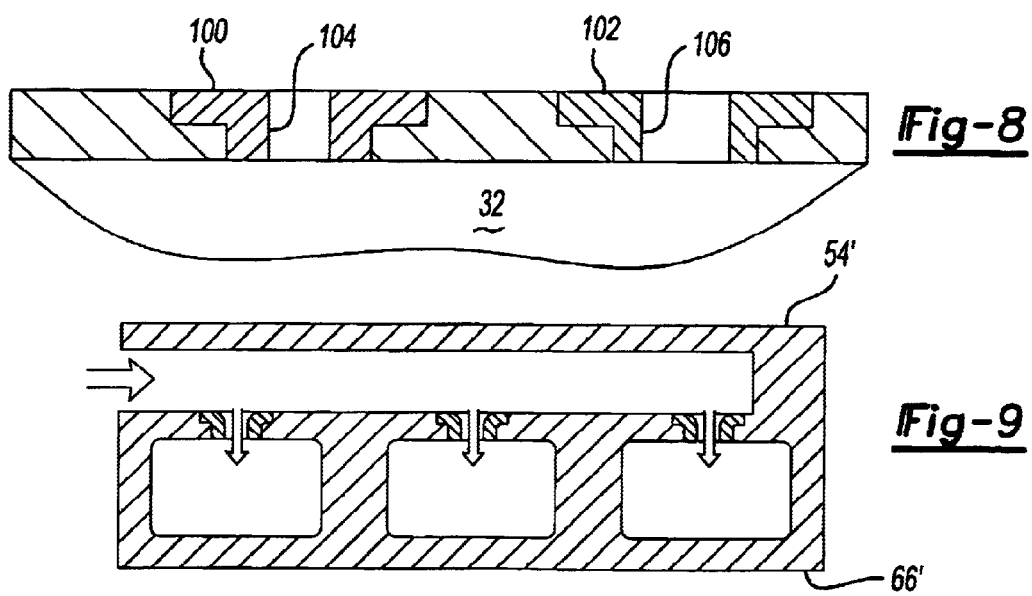
*Fig-8*
*Fig-9*

FUEL CONTROL SYSTEM

CROSS-REFERENCE TO RELATED APPLICATIONS

This application is a continuation-in-part of U.S. patent application Ser. No. 10/094,188 filed Mar. 8, 2002 now U.S. Pat. No. 6,843,238 which is hereby incorporated herein by reference.

BACKGROUND OF THE INVENTION

I. Field of the Invention

The present invention relates to a cold start fuel control system for an internal combustion engine.

II. Description of Related Art

Most modern day internal combustion engines of the type used in automotive vehicles include a plurality of internal combustion chambers. A primary intake manifold has one end open to ambient air and its other end open to the combustion chambers through intake ports formed in the engine housing as well as through one or more engine intake valves associated with each combustion chamber.

In order to provide fuel to the engine, a multi-point fuel injector is associated with each of the internal combustion engine chambers. During a warm engine operating condition, the multi-point fuel injectors, under control from the electronic control unit for the engine, provide fuel to the engine. The electronic control unit ideally controls the amount of fuel provided to the engine to achieve the desired engine performance while minimizing noxious emissions.

During a cold start engine condition, however, insufficient fuel vaporization, at least where a liquid fuel such as gasoline or diesel fuel is used, occurs if the multi-point injectors are used to provide fuel to the engine. The introduction of unvaporized or only partially vaporized fuel results in high fuel consumption, increased noxious emissions from the engine, as well as poor engine performance and slow starting. For that reason, many previously known internal combustion engines utilize a cold start fuel injector to provide vaporized fuel to the engine during a cold engine condition.

These previously known cold start fuel injectors introduce a sufficient vaporized fuel/air mixture into the intake of the primary intake manifold to provide the fuel charge for the combustion chambers of the engine during the engine warm up period. Where the internal combustion engine utilizes liquid fuel, many of these previously known cold start fuel injectors include heaters to enhance the vaporization of the fuel prior to its introduction to the engine combustion chambers. Such vaporized fuel minimizes noxious emissions and fuel consumption while not adversely affecting engine operation.

As the engine warms up, the cold start fuel injector is gradually deactivated while, simultaneously, the multi-point fuel injectors are gradually activated in order to provide a smooth transition between a cold engine condition and a warm engine condition.

Even though the heaters used by these previously known cold start fuel injectors have proven adequate for vaporizing liquid fuel, it is been the prior practice to introduce the vaporized fuel into the inlet end of the primary intake manifold. However, since the air/fuel mixture from the cold start fuel injector must pass through the still cold primary intake manifold of the engine, fuel condensation can occur within the intake manifold during a cold engine condition. Such fuel condensation adversely affects the efficiency of the engine and increases noxious emissions from the engine.

Furthermore, since the air/fuel mixture from the cold start fuel injector must travel entirely through the relatively large volume primary intake manifold before the air/fuel mixture reaches the internal combustion chambers, an appreciable time delay occurs between the activation of the cold start fuel injector and the time that the air/fuel mixture actually reaches the engine combustion chambers. This time delay may extend for several revolutions of the engine main shaft thus resulting in excessive engine cranking as well as slow engine starting.

SUMMARY OF THE PRESENT INVENTION

The present invention provides a cold start fuel control system which overcomes all of the above-mentioned disadvantages of the previously known systems.

In brief, the cold start fuel control system of the present invention is used in conjunction with an internal combustion engine having a plurality of internal combustion chambers. A primary intake manifold has an inlet and an outlet end wherein the outlet end of the intake manifold is connected to the engine combustion chambers through individual intake passageways formed in the engine housing for each combustion chamber. The engine also includes a source of fuel which provides fuel to the engine combustion chambers during a warm engine condition through a multi-point fuel injector system.

The cold start fuel control system of the present invention includes at least one cold start fuel injector having an inlet and an outlet. Upon activation, the cold start fuel injector injects fuel towards its outlet. The fuel injector outlet is then fluidly connected through an auxiliary intake manifold and control orifice to the engine combustion chambers wherein at least one control orifice is associated with each engine combustion chamber. The control orifice may be either of a preset size or, optionally, may be varied in cross-sectional area either by electrical, electromechanical or other means. Furthermore, the fluid volume of the auxiliary manifold is much smaller than the fluid volume of the primary intake manifold.

An engine control unit (ECU) controls the fuel management for the internal combustion engine. In response to one or more input signals, such as the mass airflow rate, temperature, throttle position, mass airflow sensor, engine RPM and/or fuel charge lambda sensor, the ECU controls the variable control orifice to vary the flow rate through the orifice in order to achieve the desired engine performance and emission requirements. The ECU also controls activation of the cold start fuel injector as well as the multi-point injectors.

The outlet of the cold start fuel injector is fluidly connected to the interior chamber of the auxiliary intake manifold so that fuel from the cold start fuel injector, after vaporization by conventional heaters, passes through the control orifices to the combustion chambers for the engine. Furthermore, preferably the control orifice is positioned closely adjacent the intake valve for its associated combustion chamber so that, after the fuel vapor charge passes through the control orifice, the charge must pass through only a short length of the intake manifold. Consequently, the possibility of fuel condensation in the intake manifold is minimized. Additionally, the fuel charge from the auxiliary intake manifold reaches the internal combustion chambers during the initial cranking of the engine thus achieving quicker engine starting than previously known.

A shroud, which may be either at a fixed position or having a variable position under control of the ECU, is optionally associated with each control orifice. The shroud thus controls the introduction of the fuel charge from the auxiliary intake manifold into the airflow stream through the primary intake manifold to achieve better fuel vaporization, lower emissions and better engine starting.

Similarly, two or more control orifices may be associated with each combustion chamber. The use of two or more control orifices between the auxiliary manifold and the engine combustion chamber achieves additional swirling of the fuel charge from the auxiliary intake manifold. Such additional swirling enhances vaporization of any unvaporized fuel in the fuel stream. The control orifices may also be opened to achieve better fuel vaporization.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 6 is a side view illustrating still a further preferred embodiment of the present invention;

FIG. 7 is a view similar to FIG. 6 but illustrating a modification thereof;

FIG. 8 is a side sectional view illustrating still a further modification of the present invention; and FIG. 9 is a view of the modification of the present invention.

DETAILED DESCRIPTION OF PREFERRED EMBODIMENTS OF THE PRESENT INVENTION

Figure 1:
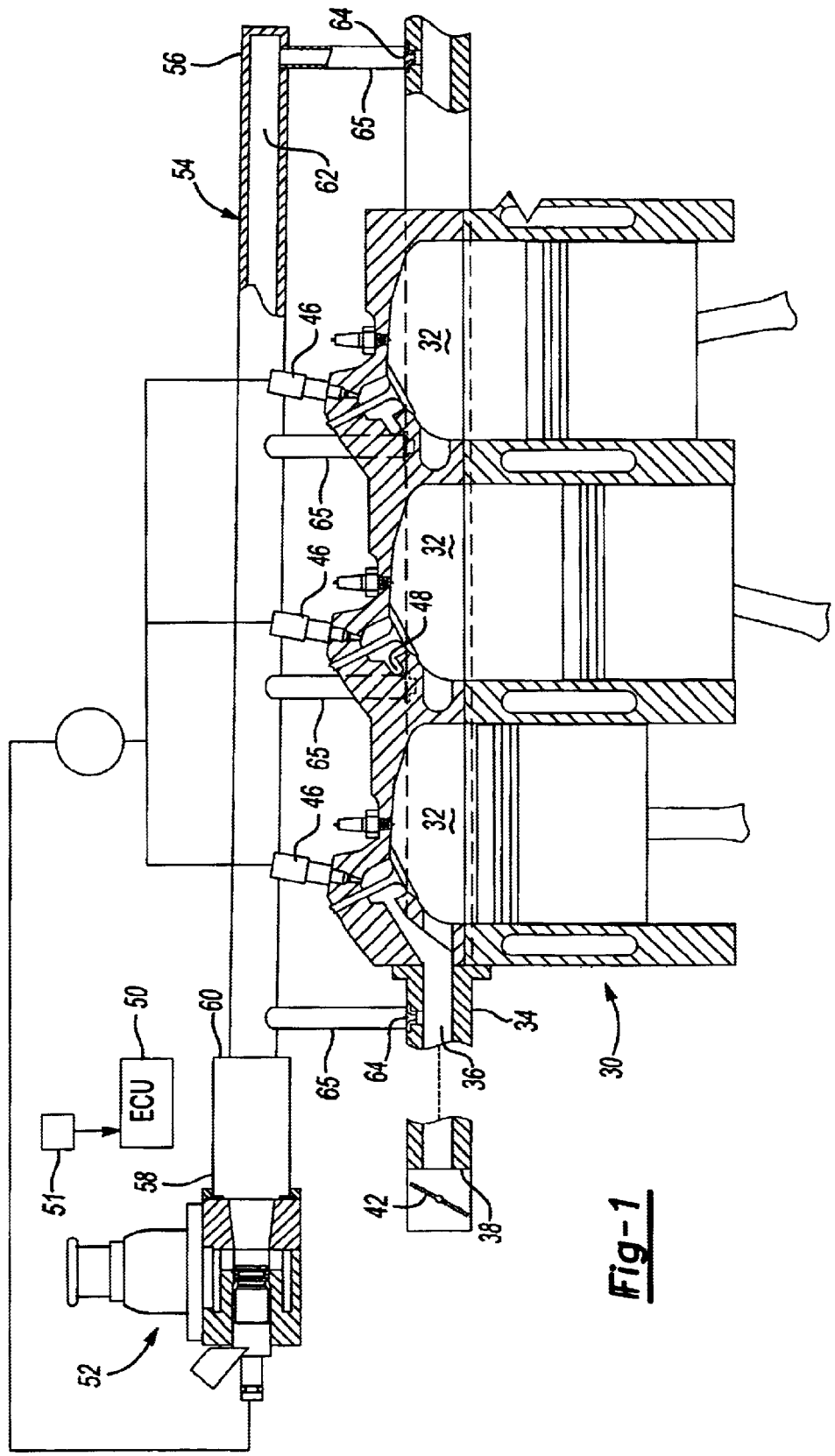
FIG. 1 is a side diagrammatic view illustrating a preferred embodiment of the present invention.
Figure 2:
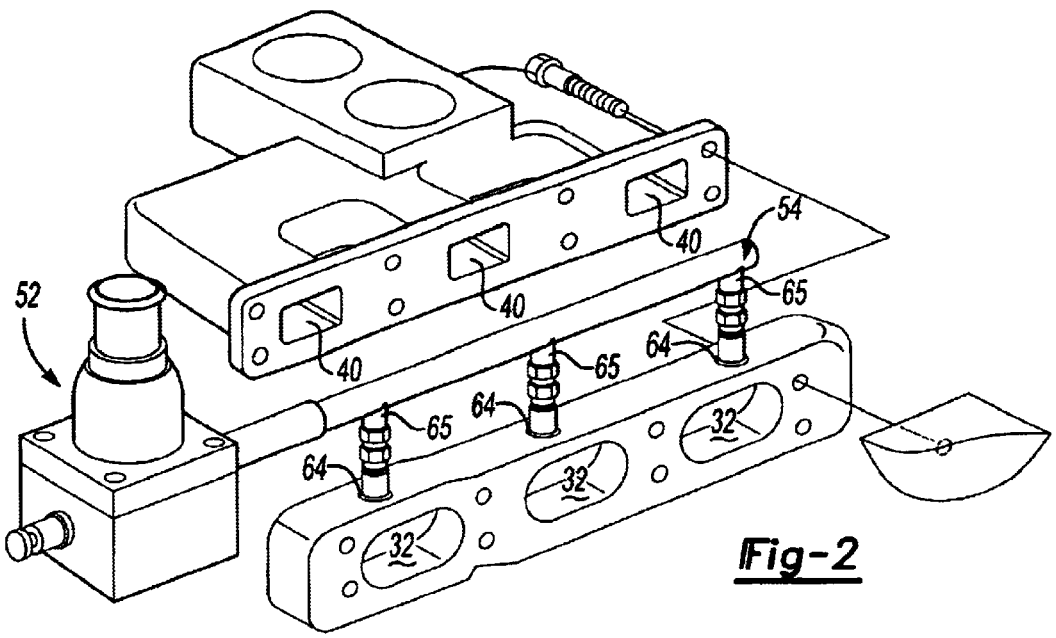
FIG. 2 is an elevational view illustrating a preferred embodiment of the present invention.

With reference first to FIGS. 1 and 2, an internal combustion engine 30 having a housing 31 is shown having several internal combustion chambers 32. These internal combustion chambers 32 are typically arranged in one or two banks of three or four internal combustion chambers 32 per bank.

A primary intake manifold 34 (illustrated only partially) has an interior chamber 36, an inlet end 38 and a plurality of outlet ports 40. The outlet ports 40 are fluidly connected to the engine combustion chamber 32 through intake passageways 41 formed in the engine housing 31 so that each port 40 and each passageway 41 is associated with one or more combustion chambers 32. Thus, during engine cranking, the engine pistons induct air from the inlet 38 of the primary intake manifold 34, through the primary intake manifold interior chamber 36 and the outlet ports 40 and passageways 33 to the combustion chambers 32. A throttle 42 (FIG. 1), illustrated only diagrammatically, is fluidly connected in series between the inlet end 38 of the primary intake manifold 34 and the engine combustion chambers 32 so that the throttle 42 controls the airflow volume through the primary intake manifold 34.

Still referring to FIGS. 1 and 2, a source of fuel 44 (FIG. 1) provides fuel to the internal combustion chambers 32 during a warm engine condition through multi-point fuel injectors 46. One fuel injector 46 is associated with each engine combustion chamber 32 and is typically positioned immediately upstream of an intake valve 48 associated with each combustion chamber 32. An engine control unit (ECU) 50, illustrated only diagrammatically, manages the fuel delivery to the engine in response to inputs from various sensors 51 (only one illustrated). The sensors 51 can, for example, comprise mass airflow sensors, oxygen sensors, temperature sensors, lambda sensors, throttle position sensors and/or the like. The ECU 50 controls the activation of the multi-point injectors 46 as well as other engine components.

With reference now particularly to FIG. 1, the cold start fuel control system of the present invention comprises a cold start fuel injector assembly 52 as well as an auxiliary intake manifold 54. In a fashion which will be subsequently described in greater detail, the cold start fuel injector assembly provides vaporized fuel/air mixture to the engine combustion chambers 32 through the auxiliary intake manifold 34 during a cold start engine condition.

The auxiliary intake manifold 54 preferably comprises an elongated tube 56 having an inlet end 58 fluidly connected to the outlet 60 of the cold start fuel injector assembly 52. The auxiliary intake manifold includes an interior chamber 62 which is smaller in volume than the volume of the interior chamber 36 of the primary intake manifold 34. Preferably, the ratio of the volume of the primary intake manifold 34 to the volume of the auxiliary intake manifold is 5:1 or greater. Additionally, the interior chamber 62 of the auxiliary intake manifold 34 is fluidly connected by one or more control orifices 64 to the interior chamber 36 of the primary intake manifold 34 immediately upstream from each of the combustion chambers 32. Consequently, for the four engine combustion chambers 32 illustrated in FIG. 1, one or more control orifice members 64 fluidly connect the interior chamber 62 of the auxiliary intake manifold 54 to each engine combustion chamber 32 through a fuel feed tube 65.

With reference now particularly to FIG. 2, each control orifice member 64 is preferably contained within a manifold housing portion 66 so that each control orifice member 64 is open to a throughbore 67 in the manifold housing portion 66. The auxiliary intake manifold 54 is then fluidly connected to the manifold housing portion 66 so that the fuel/air vapor charge from the cold start fuel injector 52 passes through the control orifice members 64 and into the throughbores 67 of the manifold housing portion 66. This manifold housing portion 66 is then sandwiched in between the intake manifold outlet ports 40 and the intake passageways 41 in the engine housing 31 so that the throughbores 67 are fluidly connected in series between the intake manifold 34 and the engine intake passageways 41. The utilization of the manifold housing portion 66 with the control orifice members 64 thus facilitates assembly of the cold start fuel control system to the engine.

With reference to FIG. 9 a modified manifold housing portion 66 is shown in which auxiliary intake manifold 54 is internally formed with the manifold housing portion 66.

Figure 3:
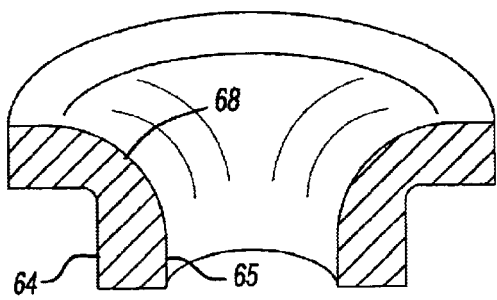
FIG. 3 is a side view illustrating a first preferred embodiment of a control orifice.

With reference now to FIG. 3, a cross section of an exemplary control orifice member 64 with a throughbore 65 is shown in which the throughbore 65 has an outwardly flared surface 68 facing upstream, i.e. towards the interior of the auxiliary intake manifold 54. The flared surface 68 facilitates a smooth fluid flow of the fuel vapor from the auxiliary intake manifold 54 through the control orifice 64 and to the engine combustion chambers 32.

Figure 4:
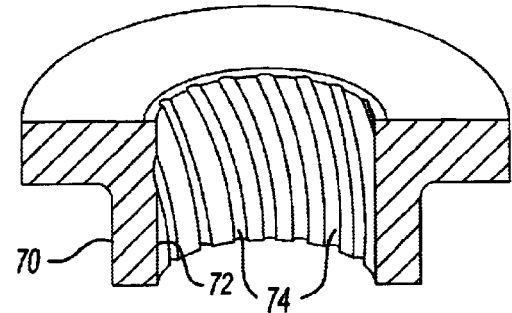
FIG. 4 is a view similar to FIG. 3 but illustrating a modification thereof.

With reference now to FIG. 4, a cross section of a modified control orifice 70 with a throughbore 72 is shown. One or more vanes 74 are provided around the interior of the throughbore 72 impart a swirl to the fuel vapor flowing from the auxiliary intake manifold 54 and through the bore 72 of the control orifice 70. The swirl imparted by the vanes 74 enhances vaporization of any unvaporized fuel that may be contained within the fuel charge from the auxiliary intake manifold 54.

The control orifice members 64 and 70 illustrated in both FIGS. 3 and 4 have a fixed opening or bore through the control orifice members 64 or 70. Furthermore, the size of the openings 65 and 72 through the control orifices 64 and 70, respectively, are fixed. However, the size or cross-sectional area of the bores 65 and 72 may vary from one combustion chamber 32 to a different combustion chamber 32 in order to achieve the desired distribution of the fuel vapor from the auxiliary intake manifold 54.

Figure 5A:
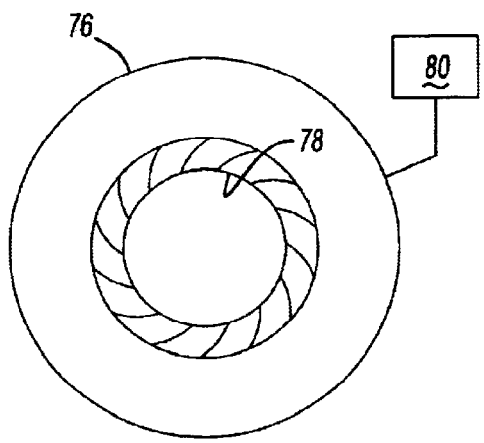
FIGS. 5A and 5B are plan views illustrating still a further embodiment of the control orifice.
Figure 5B:
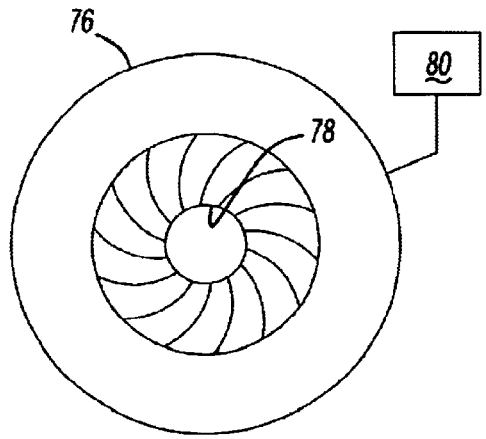

With reference now to FIGS. 5A and 5B, a plan view of a still further control orifice 76 is illustrated in which the control orifice 76 has a throughbore 78. However, unlike the control orifice members 64 and 70 illustrated in FIGS. 3 and 4, the control orifice 76 in FIGS. 5A and 5B is variable in cross-sectional area. For example, the cross-sectional area of the bore 78 in FIG. 5A is much larger than the cross-sectional area of the throughbore 78 illustrated in FIG. 5B. Any conventional means, such as an electromechanical valve 79, may be used to vary the cross-sectional area of the throughbore 78. A control mechanism 80, illustrated only diagrammatically, controls the valve 79 to vary the cross-sectional area of the bore 78. Furthermore, the control mechanism 80 is controlled by the ECU 50 (FIG. 1) and the ECU varies the cross-sectional area of the bore 78 in response to input signals from one or more of the sensors 51.

The variation of the cross-sectional area of the bore 78 of the control orifice 76 is desirable to achieve quick engine starting coupled with low emissions in dependence upon different engine operating conditions. For example, in the event that the temperature of the engine is very cold, a larger cross-sectional area for the bore 78 may be desirable in order to ensure rapid engine starting. Conversely, in the event that the engine is warmer, e.g. room temperature, a smaller cross-sectional area for the bore 78 may be sufficient to ensure quick engine starting coupled with low engine combustion emissions. Furthermore, the cross-sectional area of the bore 78 of the control orifice 76 may differ from one engine combustion chamber to another in order to ensure a desired fuel distribution to the multiple engine combustion chambers 32.

With reference now to FIG. 6, optionally a shroud 90 is associated with one or more of the control orifices 64. The shroud 90 is positioned within the manifold housing portion 66 of the cold start fuel system and thus in series with the airflow from the intake manifold 34 and to the intake passageways 41 in the engine housing 31. The shroud 90 is aligned with the fuel orifice 64 and is open only downstream in the direction of the fuel passageways in the engine housing.

In operation, the shroud 90 effectively increases the vaporization of any unvaporized fuel that may be present in the fuel charge from the auxiliary intake manifold 54 due to the swirling induced in the fuel charge caused by the venturi effect of the inducted air past the shroud 90.

The embodiment of the shroud 90 illustrated in FIG. 6 is fixed with respect to the manifold housing portion 66. However, with reference to FIG. 7, if desired, the position of the shroud 90 may be controlled by an actuator 92 (illustrated only diagrammatically) between the positions shown in solid and phantom lines in FIG. 7. The actuator 92, which is preferably an electromechanical actuator, is controlled by the ECU 50 (FIG. 1) in response to one or more inputs from the sensors 51. The position adjustment of the shroud 90 illustrated in FIG. 7 is advantageous to vary the venturi effect of the inducted airflow past the shroud 90 in dependence upon different engine operating conditions. For example, during a very cold engine operating condition, a relatively wider opening, as illustrated in solid line in FIG. 7, may be desired to not only enhance the amount of fuel vapor flow into the inducted air stream, but to also enhance the vaporization of the fuel caused by the inducted airflow through the manifold housing portion 66.

With reference now to FIG. 8, a still further modification of the present invention is shown in which two control orifices 100 and 102 are associated with each combustion chamber 32. The control orifice 100 has a throughbore 104 which is different in cross-sectional area than a throughbore 106 on the control orifice 102. Consequently, the induction of the fuel vapor from the auxiliary intake manifold 54 through the bores 104 and 106 of the control orifices 100 and 102 will occur at a different mass flow rate. The difference in the mass flow rate through the control orifices 100 and 102 effectively induces a swirl in the fuel charge provided through the control orifices 100 and 102 to their associated internal combustion chamber 32 thus enhancing the vaporization of any unvaporized fuel that may be present in the fuel charge. Furthermore, although the bores 104 and 106 of the control orifices 100 and 102 are illustrated in FIG. 8 as being fixed, it will be understood that they may optionally be variable in cross-sectional area. The bores 104 and 106 optionally also include vanes.

The control orifices, as previously described, are positioned closely adjacent the intake valve for their associated combustion chamber 32. Consequently, the control orifices are positioned closely adjacent the multi-point fuel injector 46 associated with the individual combustion chambers. The actual position of the control orifices may be either on the same side of the multi-point fuel injector associated with their particular combustion chamber 32, or may be opposed to the multi-point fuel injector. The control orifices may also be positioned upstream, downstream or aligned with the multi-point fuel injectors.

Although the cold start system of the present invention is used particularly advantageously for internal combustion engines which utilize liquid fuel, such as gasoline or diesel fuel, it may alternatively be used with gaseous fuel such as CNG, propane and the like.

From the foregoing, it can be seen that the present invention provides an improved cold start fuel system which provides enhanced vaporization of the fuel and which minimizes noxious emissions. Furthermore, since the ECU optionally controls not only the bore size of the control orifice, but also the position of the shroud, if present, accurate fuel vapor delivery to the internal combustion engine can be achieved regardless of the engine operating conditions during a cold start condition.

Having described our invention, however, many modifications thereto will become apparent to those skilled in the art to which it pertains without deviation from the spirit of the invention as defined by the scope of the appended claims.

We claim:

1. For use in combination with an internal combustion engine having an engine block, a plurality of combustion chambers, intake air passages formed in the engine block so that one intake air passage is fluidly associated with and connected to each combustion chamber, a source of fuel, and a primary intake manifold having an air inlet and a plurality of outlet ports with at least one port associated with each combustion chamber, said system comprising:

a cold start fuel injector assembly having an inlet and an outlet, said cold start fuel injector assembly inlet being fluidly connected to the source of fuel, an auxiliary intake manifold having an internal chamber, said auxiliary intake manifold having a manifold housing portion interposed between the primary intake manifold and the engine block, said manifold housing portion defining a fuel passageway fluidly connecting each air intake passage with its associated port(s) in the primary air intake manifold, a plurality of control orifice members, at least one control orifice member being associated with each combustion chamber, each control orifice member being open to one fuel passageway in the manifold housing portion, said cold start fuel injector assembly outlet being fluidly connected to said auxiliary intake manifold chamber, a plurality of fuel feed tubes, one fuel feed tube extending between said auxiliary intake manifold chamber and to each control orifice member.

2. The invention as defined in claim 1 and comprising at least two control orifice members open to each fuel passageway in said manifold housing portion.

3. The invention as defined in claim 1 and comprising means to vary the cross-sectional area of said orifice members.

4. A cold start fuel control system for use with an internal combustion engine having a plurality of combustion chambers, a source of fuel, and a primary intake manifold having an air inlet and an outlet port connected to each combustion chamber, said system comprising:

a cold start fuel injector assembly having an inlet and an outlet, said cold start fuel injector assembly being fluidly connected to the source of fuel, an auxiliary intake manifold having an internal chamber, said cold start fuel injector assembly outlet being fluidly connected to said auxiliary intake manifold chamber, said auxiliary intake manifold chamber being fluidly connected through a control orifice to each of the combustion chambers at a position downstream from the inlet of the primary intake manifold means to vary the cross-sectional area of said control orifice; and a control circuit response to at least one input signal, said control circuit having an output signal and means responsive to said output signal for varying the cross-sectional area of said control orifice.

5. A cold start fuel control system for use with an internal combustion engine having a plurality of combustion chambers, a source of fuel, and a primary intake manifold having an air inlet and an outlet port connected to each combustion chamber, said system comprising:

a cold start fuel injector assembly having an inlet and an outlet, said cold start fuel injector assembly being fluidly connected to the source of fuel, an auxiliary intake manifold having an internal chamber, said cold start fuel injector assembly outlet being fluidly connected to said auxiliary intake manifold chamber, said auxiliary intake manifold chamber being fluidly connected through a control orifice to each of the combustion chambers at a position downstream from the inlet of the primary intake manifold; and a shroud positioned in the primary intake manifold in alignment with at least one control orifice, said shroud having a side open to its associated combustion chamber.

6. A cold start fuel control system for use with an internal combustion engine having a plurality of combustion chambers, a source of fuel, and a primary intake manifold having an air inlet and an outlet port connected to each combustion chamber, said system comprising:

a cold start fuel injector assembly having an inlet and an outlet, said cold start fuel injector assembly being fluidly connected to the source of fuel, an auxiliary intake manifold having an internal chamber, said cold start fuel injector assembly outlet being fluidly connected to said auxiliary intake manifold chamber, said auxiliary intake manifold chamber being fluidly connected through a control orifice to each of the combustion chambers at a position downstream from the inlet of the primary intake manifold;

wherein each control orifice comprises a body having a through opening, said body being mounted within a seat in said auxiliary intake manifold; and wherein each body throughbore has an outwardly flared axial end.

7. For use in combination with an internal combustion engine having an engine block, a plurality of combustion chambers, intake air passages formed in the engine block so that one intake air passage is fluidly associated with and connected to each combustion chamber, a source of fuel, and a primary intake manifold having an air inlet and a plurality of outlet ports with at least one port associated with each combustion chamber, said system comprising:

a cold start fuel injector assembly having an inlet and an outlet, said cold start fuel injector assembly inlet being fluidly connected to the source of fuel, an auxiliary intake manifold having an internal chamber, said auxiliary intake manifold having a manifold housing portion interposed between the primary manifold and the engine block, said manifold housing portion defining a fuel passageway fluidly connecting each air intake passage with its associated port(s) in the primary air intake manifold, a plurality of control orifices, at least one control orifice being open to each fuel passageway in the manifold housing portion, said cold start fuel injector assembly outlet being fluidly connected to said auxiliary intake manifold chamber, said auxiliary intake manifold chamber being fluidly connected to each control orifice;

comprising means to vary the cross-sectional area of said control orifices; and wherein said varying means comprises electromechanical varying means.

8. The invention as defined in claim 7 and comprising a control circuit responsive to at least one input signal, said control circuit having an output signal and means responsive to said output signal for varying the cross-sectional area of said control orifice member.

9. The invention as defined in claim 8 where said at least one input signal is selected from the group of exhaust gas oxygen sensor, engine temperature, engine intake manifold vacuum, throttle position, mass airflow sensor, engine rpm and fuel charge lambda sensor.

10. A cold start fuel control system for use with an internal combustion engine having a plurality of combustion chambers, a source of fuel, and a primary intake manifold having an air inlet and an outlet port connected to each combustion chamber, said system comprising:
- a cold start fuel injector assembly having an inlet and an outlet,
- said cold start fuel injector assembly being fluidly connected to the source of fuel,
- an auxiliary intake manifold having an internal chamber,
- said cold start fuel injector assembly outlet being fluidly connected to said auxiliary intake manifold chamber,
- a control orifice member associated with each of the combustion chambers, each control orifice member being positioned downstream from the inlet of the primary intake manifold and adjacent its associated combustion chamber,
- a plurality of fuel feed tubes, one fuel feed tube extending between said auxiliary intake manifold chamber and each control orifice member.

11. The invention as defined in claim 10 and comprising means to vary the cross-sectional area of said control orifice member.

12. The invention as defined in claim 4 where said at least one input signal is selected from the group of sensor output signal exhaust gas oxygen sensor output signal, an engine temperature sensor output signal, engine intake manifold vacuum sensor output signal, throttle position sensor output signal, mass airflow sensor output signal, engine rpm and fuel charge lambda sensor output signal.

13. The invention as defined in claim 4 wherein said varying means comprises mechanical varying means.

14. The invention as defined in claim 4 wherein said varying means comprises electromechanical varying means.

15. The invention as defined in claim 10 and comprising a shroud positioned in the primary intake manifold in alignment with at least one control orifice member, said shroud having a side open to its associated combustion chamber.

16. The invention as defined in clam 5 and an actuator which varies the position of said shroud.

17. The invention as defined in claim 16 and comprising a shroud control circuit responsive to at least one input signal, said shroud control circuit having an output signal and means responsive to said output signal for varying the position of each shroud relative to its associated control orifice member.

18. The invention as defined in claim 16 where said at least one input signal is selected from the group of exhaust gas oxygen sensor, engine temperature, engine intake manifold vacuum, throttle position, mass airflow sensor, engine rpm and fuel charge lambda sensor.

19. The invention as defined in claim 17 wherein said shroud comprises a wall section mounted in the primary intake manifold, and wherein said varying means comprises means for varying the angle of the plane of the wall section relative to the primary intake manifold.

20. The invention as defined in claim 10 wherein the cross-sectional area of each control orifice member provides a substantially equal fuel charge to each combustion chamber.

21. The invention as defined in claim 6 and comprising at least two control orifice members associated with each combustion chamber.

22. The invention as defined in claim 6 wherein said control orifice members are arranged to induce a swirl in the fuel flow through said control orifices.

23. The invention as defined in claim 10 wherein the volume of said auxiliary intake manifold chamber is less than a volume of the primary intake manifold.

24. The invention as defined in claim 10 wherein said auxiliary intake manifold chamber is fluidly connected to each internal combustion chamber closely adjacent to the outlet of the primary intake manifold at each said internal combustion chamber.

25. The invention as defined in claim 10 wherein the internal combustion engine includes a fuel injector associated with each combustion chamber and open to the primary intake manifold, and wherein each said control orifice member is open to the primary intake manifold on a side of the primary intake manifold opposite from the associated fuel injector.

26. The invention as defined in claim 10 wherein at least one control orifice member has at least one vane which induces a swirl to fluid flow through the control orifice.

* * * * *